United States Patent [19]

Josephson

[11] 4,326,244
[45] Apr. 20, 1982

[54] FLYBACK POWER SUPPLY BOOSTER CIRCUIT

[75] Inventor: Elliot Josephson, Los Altos, Calif.

[73] Assignee: Astes Components, Ltd., Santa Clara, Calif.

[21] Appl. No.: 217,675

[22] Filed: Dec. 18, 1980

[51] Int. Cl.³ .............................................. H02H 7/122
[52] U.S. Cl. ........................................ 363/56; 363/21
[58] Field of Search .................... 331/112; 363/18–21, 363/29, 30, 55, 56

[56] References Cited

U.S. PATENT DOCUMENTS

| | | | |
|---|---|---|---|
| 3,302,130 | 1/1967 | Minks | 331/110 |
| 3,421,069 | 1/1969 | Minks | 363/19 |
| 3,523,235 | 8/1970 | Schaefer | 331/112 X |
| 3,562,668 | 2/1971 | Bartlett et al. | 363/21 X |

OTHER PUBLICATIONS

Hnatek, Design of Solid-State Power Supplies, 2nd Ed., 1980, pp. 68–79.

*Primary Examiner*—William M. Shoop
*Attorney, Agent, or Firm*—Fitch, Even, Tabin, Flannery & Welsh

[57] ABSTRACT

A booster circuit is disclosed for enabling a flyback power supply having a power transformer normally operative in a free running mode to have an increased power output at high loads, comprising a clock circuit including a first transistor that is turned on whenever a resistor-capacitor network times out before the end of the flyback interval of the power supply, with the result that the flyback interval is caused to terminate early, and the power transformer to begin recharging. A second transistor acts to disable the operation of this first transistor whenever the output voltage of the power supply is found to not be in regulation.

9 Claims, 3 Drawing Figures

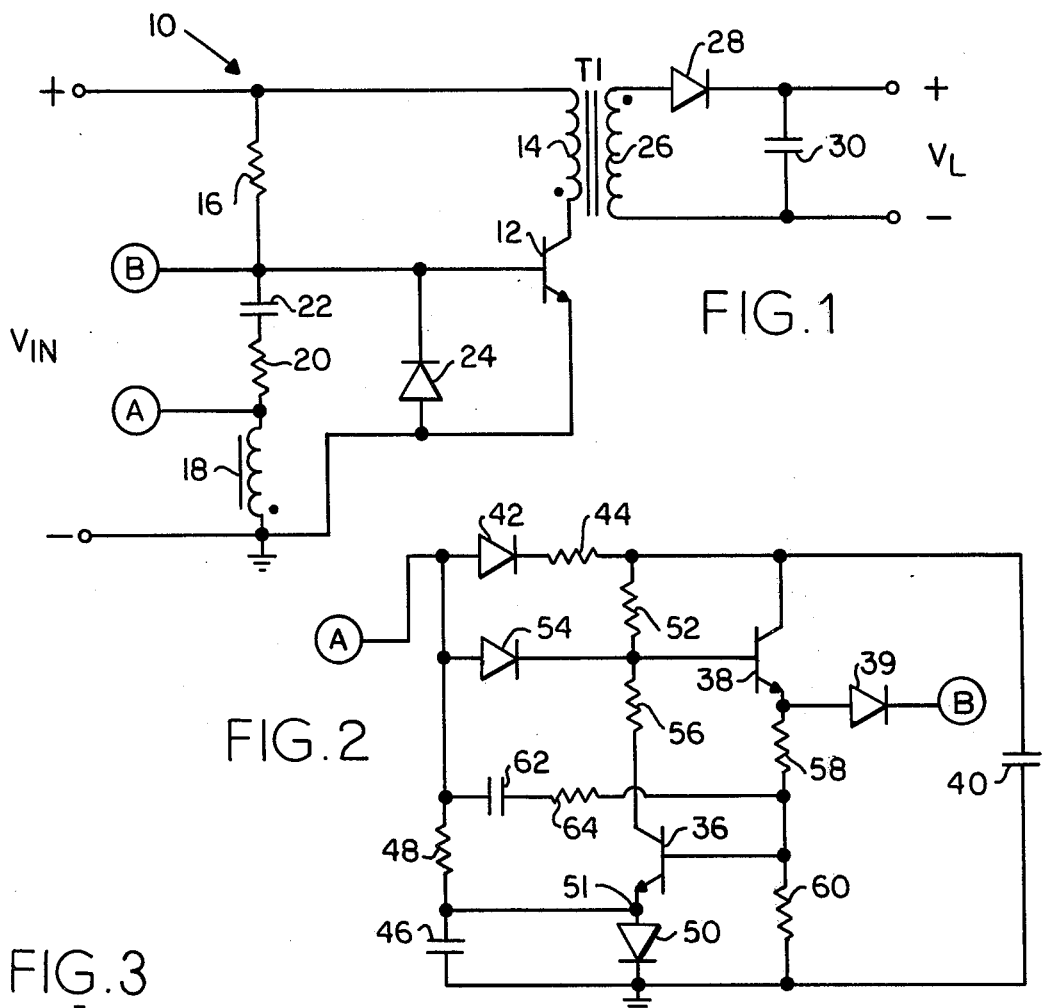
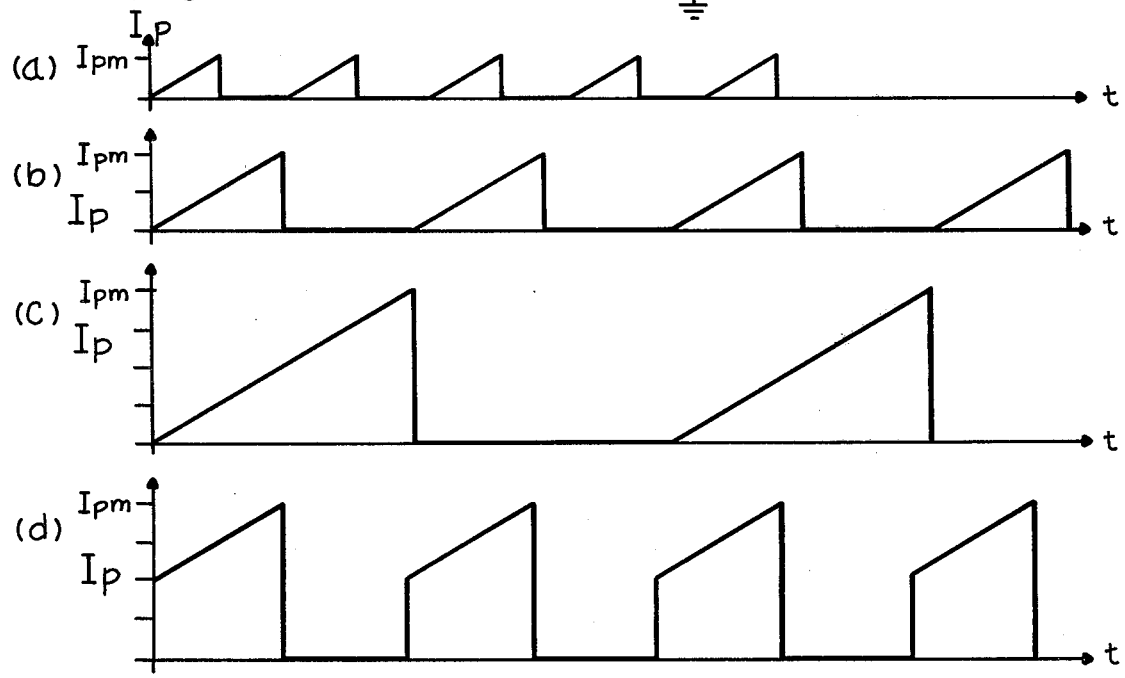

FLYBACK POWER SUPPLY BOOSTER CIRCUIT

This invention relates in general to flyback type DC power supplies, and, more particularly, to flyback type power supplies operative in both a free-running and a clock mode.

Flyback power supplies are advantageous at lower power levels over other switching regulators due to the fact that they are generally simpler, they require a reduced number of components, they allow a multiple of regulated outputs to be available from a single supply, and converter efficiency is high. A flyback power supply is a switching regulator that works by cyclically storing energy in a magnetic field, usually in a power transformer, and then dumping this stored energy into a load. Usually, a first DC potential or voltage is converted by the power transformer into one or more other DC output voltages. By varying the amount of energy stored and dumped per cycle, the output power can be controlled and regulated. A high power switching transistor connected in series with the primary winding of the power transformer normally provides such a switching function. That is, the on-time and off-time of this transistor control the amount of energy coupled across the power transformer. When the power transistor is on, current flows through the primary winding of the power transformer, and energy is stored in the transformer. When the power transistor is off, the stored energy is transferred out into a secondary circuit by means of current flowing out of one or more secondary windings of the power transformer. This latter period is normally called the flyback interval of the power supply. Note that the primary current does not flow in the power transformer at the same time that the secondary current is flowing.

To provide control of the on and off times of the power transistor, and thereby regulation of the power supply, a negative feedback circuit is provided. This circuit controls the timing of the power transistor as a function, for example, of the difference between the voltage being output by the power supply and a voltage reference. Generally, the power transistor is designed for switching speeds of at least 20 kHz to prevent the switching of the power supply from being audible.

There are generally two modes of operation for a flyback power supply. In one mode, the energy in the power transformer is totally coupled to the output load before the next cycle begins. In the second mode, the power transformer is caused to begin recharging, i.e. current is fed to the primary winding of the power transformer before discharge of the energy in the power transformer has been completed and the normal flyback interval ended. The first mode is generally called the free-running mode, while the second mode is generally called a clock mode.

In the free-running mode, the switching frequency of the power transistor is generally enabled to vary as a function of the load demand on the supply. At no-load the transistor is on for a minimum length of time, while at a maximum rated load, the transistor is on for a maximum safe time, defined to be below the energy saturation point of the power transformer. This timing results from the fact that as voltage is applied across the transformer, it allows a constantly increasing ramp current to be coupled through its primary winding. If there is only a light load, less energy needs to be input to the transformer to maintain a regulated output voltage, so that this level is reached faster, enabling the transistor to go off sooner. Thus, if the off-time of the transistor is equal to, or at least a fixed percentage of, its on-time, then the switching frequency of the transistor is higher at no-load than at a high load.

In general, the clock mode is distinguishable from the free-running mode in that in the clock mode the power transistor is driven at a constant frequency, even if the output of the supply experiences an extremely heavy load, e.g. a short circuit. Some other protection for output voltage overload is therefore necessary for flyback power supplies operating in this latter mode. One of the advantages of the clock mode is that it enables a higher level of output power to be produced by the power supply as compared with a free-running flyback power supply. However, due to the drawback of this mode in terms of overload protection, most flyback transformers operate in the free-running mode.

What is lacking in prior art flyback power supplies is a supply that can operate either in a free-running mode or in a clock mode, depending on the changing needs of the circuit. Such a circuit is needed to take advantage of operational benefits inherent in each mode, especially the ability in the clock mode to couple greater power through the transformer when higher loading is experienced by the supply, while protecting the supply from damage if an overload or short circuit is experienced.

It is therefore an object of the present invention to provide a means for increasing the power output capability of a normally free-running flyback power supply at high load levels while providing means for disabling the increased power output in the event of an overload or short circuit on the secondary side of the power supply.

It is a further object of the present invention to provide means for combining in a single flyback power supply the inherent benefits of both a free-running mode and a clock mode power supply.

It is another object of the present invention to only allow the greater power output of a clock mode flyback power supply to be operative so long as the voltage output by such a supply remains in regulation.

These and other objects and advantages of the present invention are more particularly set forth in the following detailed description and in the accompanying drawings of which:

FIG. 1 is a schematic of a free-running flyback power supply circuit;

FIG. 2 is a flyback power supply booster circuit according to the present invention;

FIGS. 3(a), (b), and (c) illustrate current vs. time curves in a power transformer primary winding at three different free-running load conditions; and FIG. 3(d) shows the primary winding current under the heavy load conditions illustrated in FIG. 3(c) with the booster circuit operative.

Broadly stated, the present invention comprises a booster circuit for a free-running flyback power supply, said circuit including means for establishing a maximum flyback interval that is shorter than what the normal free-running interval would be when the supply is feeding a heavy load, but only so long as the supply output voltage remains substantially in regulation. This clocking of the flyback interval generates a clock mode operation, since the power transistor is turned on before all the energy is delivered out of the power transformer. In other words, when the flyback interval duration exceeds a predetermined maximum, the booster circuit according to the present invention overrides the normal free-running operation of the power supply, and terminates the flyback interval, causing an early beginning to the power transformer recharging cycle.

The effect of this operation of the booster circuit is to cause the current through the primary winding of the power transformer to begin increasing from a minimum current level greater than zero, a level corresponding to the energy level remaining in the transformer. The result is that a greater amount of power is coupled to the output load in a given unit of time than if the transformer were allowed to fully discharge.

An embodiment of a conventional free-running flyback switching regulator is shown at 10 in FIG. 1. A positive voltage source $V_{in}$ is connected to the collector of a power transistor 12 through the primary winding 14 of a power transformer T1. The emitter of power transistor 12 is grounded.

The base of power transistor 12 is connected to voltage source $V_{in}$ through resistor 16. This base is also driven from a tertiary winding 18 of power transformer T1 through a resistor 20 and capacitor 22. Resistor 16 operates to dependably start the power supply 10 by providing a small base current that brings the collector current of the transistor 12 on far enough to cause regenerative feedback. This drives transistor 12 into saturation, i.e. it goes on, by means of winding 18, which operates as a feedback winding. As described in more detail below, this is because once transistor 12 goes on, the voltage at the side of tertiary winding 18 identified as terminal A goes positive and remains positive, keeping transistor 12 on until the current in primary winding 14 reaches a certain point, at which time the voltage at terminal A goes negative, turning off transistor 12. A diode 24 recharges capacitor 22 during the flyback interval when transistor 12 is off. Power transistor T1 also includes at least one secondary winding 26. Current flows out of secondary winding 26 when power transistor is off and therefore no current is flowing in primary winding 14. Secondary current continues to flow so long as energy remains to be discharged from transformer T1 and transistor 12 stays off. This current is rectified to obtain the desired output DC voltage.

An output rectifier circuit for flyback power supply 10 conventionally includes a diode 28 in series with the power transformer secondary winding 26, and a capacitor 30 in parallel with the secondary winding 26 and diode 28. In operation, when power transistor 12 is on, diode 28 is reverse biased by the secondary winding 26, thereby blocking current flow in the secondary winding. During this time, capacitor 30 must maintain the output DC voltage level $V_L$ and supply the total output current. Of course, capacitor 30 needs to be large enough to supply this current with a minimum amount of voltage degradation during the maximum time that transistor 12 is normally on. Subsequently, when transistor 12 goes off, there is an inductive voltage step across the primary and secondary windings, which drives secondary winding 26 in an opposite polarity, thereby forward biasing diode 28. With the primary winding now open circuited, the energy that had been stored in the core of transformer T1 is delivered out of the secondary winding 26 and into capacitor 30. This replenishes the charge that capacitor 30 lost when transistor 12 was on and capacitor 30 was furnishing the load current. The level of DC output voltage which is output by capacitor 30 is a function of not only the time that transistor 12 is on and off and the source voltage level $V_{in}$, but also a function of the number of windings in the primary and secondary windings 14 and 26.

FIGS. 3(a)-3(c) graphically illustrate the current flowing in the primary winding 14 of power transformer T1 during normal operation of a flyback power supply 10 in the free-running mode. These graphs illustrate the effect of an increasing load demand on the operation of the switching transistor 12. Current is plotted vertically and time horizontally in these graphs. FIG. 3(a) illustrates operation of the power supply at a light load, FIG. 3(b) at a heavier load, and FIG. 3(c) at an even heavier load. Note that in each case, when power transistor 12 is conducting, the current through primary winding 14 increases at a constant rate as a function of the inductance of the winding 14. At a lower load, the maximum current $I_{pm}$ is reached relatively quickly. At heavier loads, it takes a much longer time to reach the maximum current $I_{pm}$.

A booster circuit according to the present invention for a flyback power supply is shown in FIG. 2. This circuit is connected to the power supply 10 shown in FIG. 1 at common terminals A and B. Terminal B, as seen in FIG. 1, is directly connected to the base of power transistor 12. Terminal A, as mentioned previously, is connected to one side of a tertiary winding 18 of power transformer T1. As a result, terminal A shifts in voltage as a function of whether or not the power supply is in an input interval, wherein current flows through the primary winding 14, and a flyback interval, wherein current flows through one or more secondary windings 26. In the preferred embodiment, terminal S is at a positive voltage during each input interval of said power supply 10, and at a negative voltage during each flyback interval.

As seen in FIG. 2, the booster circuit of the present invention is a clock circuit including two transistors, a detection transistor 36 and a second transistor 38. As described in more detail hereinbelow, transistor 36 turns on when the flyback interval of power supply 10 exceeds a predetermined maximum length of time, thereby indicating that said power supply 10 is driving a heavy load from its secondary circuit. Transistor 36 enables transistor 38 to turn on only so long as the secondary circuit of the power supply is in regulation, i.e. no overload, such as a short circuit, is being experienced. Once transistor 38 goes on, it couples a signal to terminal B, through diode 39, that is of sufficient amplitude to cause power transistor 12 to go on. The flyback interval automatically ends when transistor 12 goes on. During the input interval of the power supply 10, tertiary winding 18 puts a positive potential at terminal A, which is coupled to a capacitor 40 through a diode 42 and resistor 44, and causes capacitor 40 to charge up to a positive voltage. This voltage level is a function of the voltage at terminal A and of the time duration of the input interval, but typically is of the order of 6–10 volts.

A positive voltage at terminal A also causes a capacitor 46 to be charged up to a positive voltage through a resistor 48. The maximum voltage across capacitor 36 is determined by a diode 50, which conducts once the voltage reaches a level on the order of +0.6 volts. As a result, the point indicated as node 51, remains at this +0.6 volt level at the beginning of the flyback interval, when terminal A is no longer at a positive voltage. This initially biases the emitter of transistor 36, which is also coupled to node 51, to this positive potential.

During the flyback interval, terminal A goes negative to the extent of the voltage across tertiary winding 18, which is a function of the voltage of the other windings on transformer T1. This is significant, as described hereinbelow, since the level of this negative voltage at terminal A reflects the output voltage of the secondary side of the power transformer T1, so that when the output is not in regulation, a state usually caused by an overload being experienced by the output of the power supply, the output supply voltage goes down, and this is reflected in a reduced negative voltage at terminal A.

With terminal A at its normal negative voltage level, resistor 48 charges capacitor 46 downward from its positive potential until the voltage at node 51 reaches the point where the base to emitter drop on transistor 36 is negative, which causes transistor 36 to turn on. Note that the RC time constant of resistor 48 and capacitor 46 is set at a predetermined point to provide a constant predetermined maximum time interval, for a constant negative voltage at terminal A, before a given lower voltage level is reached. This time interval can be set to expire before the flyback interval has ended, when the flyback interval is a longer period of time, reflecting a heavier output load on the power supply. For lighter loads, the flyback interval would end before this RC time interval, so that transistor 36, and thereby the booster circuit, would remain unactuated. Consequently, this circuit comprises means for detecting when power supply 10 is experiencing a heavy load.

When transistor 36 goes on, a current is created through a resistor 52, by means of the stored charge in capacitor 40, which reflects the current through resistor 48. This resistor 52 current creates a voltage drop across this resistor which is normally sufficient to regeneratively turn on transistor 38, thereby providing an output electrical pulse to terminal B through diode 39. This latter pulse is also enabled by means of the electric charge retained in capacitor 40.

Thus, once transistor 36 goes on, indicating that the flyback interval has exceeded the predetermined interval set by resistor 48 and capacitor 46, this normally causes transistor 38 to go on. Transistor 38 couples a pulse through diode 39 to terminal B, and thereby to the base of power transistor 12. This pulse is of sufficient amplitude to cause transistor 12 to go on, thereby causing the early end to the flyback interval.

The output pulse generated by transistor 38 is terminated when tertiary winding 18 drives terminal A positive again, which occurs once power transistor 12 has begun conducting. This positive voltage at terminal A turns off transistor 38 through diode 54. Resistors 56, 58 and 60 are conventional biasing resistors whose values are well known to one of ordinary skill in the art.

If the power supply is in an overload condition, the negative voltage at terminal A is not as negative as it would be if the output were in regulation. For example, if the output voltage $V_L$ is normally at 5 volts, regulation may be defined to be the existence at the output of any voltage between 4.5 volts and 5.5 volts. If the output voltage drops below, say, 4 volts, the booster circuit according to the present invention is designed to not operate. This operation results from the fact that terminal A does not go to the same negative voltage that it would otherwise reach if the output voltage were in regulation. This is because an overload condition would affect the voltage across secondary winding 26, and thereby tertiary winding 18. Such a lesser negative voltage at terminal A causes the current to be developed across resistor 52 to be insufficient to turn on transistor 38, once transistor 36 has gone on.

The circuit comprising the series connection of capacitor 62 and resistor 64 is designed to fire transistor 36, and thus the booster circuit, while the power supply 10 is operating in its normal free-running mode at lower load levels. That is, when the load is lighter, the booster circuit does not have time to time out. This resistor-capacitor circuit operates merely to avoid jitter on the power transistor 12 waveform that could result if either transistor 36 or transistor 38 were to go on during an input interval.

The total power available from a flyback power supply 10 using a booster circuit according to the present invention is increased in a manner as best illustrated in FIG. 3(d). As seen in that figure, when a heavy load is being experienced by the power supply, the booster circuit operates to cause the power transistor 12 to turn on and begin coupling current through primary winding 14 before all of the energy has been discharged from power transformer T1. This results in the coupling of a greater amount of energy through transformer T1 per unit of time than if the clocking action of the booster circuit did not occur. As seen in FIG. 3(d), as a result of the operation of the booster circuit, at a high load the frequency of input interval pulses of power transistor 12 is increased, and the amount of current coupled through primary winding 14 in each input interval is higher, since the primary winding current rises from a non-zero point to a maximum current $I_{pm}$ rather than from zero current.

It will, of course, be understood that modification of the present invention in its various aspects will be apparent to those skilled in the art. As such, the scope of the present invention should not be limited by the particular embodiment and specific construction herein described, but should be defined only by the appended claims and equivalents thereof.

What is claimed is:

1. In a flyback power supply having a free-running mode comprised of input intervals, wherein a switch means causes current to be fed through a power transformer primary, thereby storing energy in said transformer, alternately followed by flyback intervals, wherein said switch means causes the power transformer primary to be open-circuited, and current is output from the transformer secondary into a secondary circuit until all of said stored energy is discharged, the length of said input intervals and flyback intervals being dependent upon the load on the secondary circuit, an improvement comprising:
   means for detecting a high load condition; and
   means responsive to said high load condition for causing said switch means to feed current through said transformer primary prior to the end of the free-running flyback interval.

2. In the flyback power supply of claim 1, a further improvement comprising:
   means for detecting an overload condition in said secondary circuit; and
   means for inactivating said means responsive to said high load condition in the event of said detected overload.

3. A method for improving a free-running flyback power supply comprising the steps of:
   (a) detecting a high load condition; and
   (b) shortening the power supply flyback intervals to a fixed maximum interval so long as said high load condition remains detected, thereby increasing the power output by said flyback power supply.

4. The method of claim 3 further comprising the steps of:
   (c) detecting the presence of an overload condition; and
   (d) terminating step (b) in response thereto.

5. A booster circuit for enabling a free-running flyback power supply to have an increased power output at high loads, said supply having alternating input and flyback intervals, comprising:
   means for detecting when the length of said free-running flyback interval exceeds a predetermined maximum interval; and
   means for terminating said flyback interval when said predetermined maximum interval has been exceeded.

6. The booster circuit of claim 5 wherein said means for detecting comprises:
   a resistor and a capacitor connected in series;
   means for charging said capacitor up to a predetermined voltage level during each said input interval of the flyback power supply;
   means for allowing said capacitor to discharge during each said flyback interval;
   a detection transistor; and
   means for switching on said detection transistor when said capacitor has discharged to a predetermined fraction of its predetermined voltage level, said terminating means being responsive to the on state of said detection transistor to end said flyback interval.

7. The booster circuit of claim 6 further comprising:
   means for detecting when said power supply output is not in regulation; and
   means responsive to said detected out of regulation state for disabling the operation of said terminating means, said disabling means including a second transistor operatively connected between said detection transistor and said terminating means, said second transistor preventing the on-state of said detection transistor from being coupled to said terminating means when said power supply is not in regulation.

8. The booster circuit of claim 7 wherein said means for detecting when said power supply is not in regulation comprises:
   means for detecting the present level of the voltage output by said power supply;
   a second capacitor charged during each input interval of the flyback power supply to a level representative of said output voltage level; and
   means for discharging said second capacitor through each transistor when said detection transistor is on, such that said second transistor is caused to go on only if said capacitor has been charged to a voltage beyond a predetermined minimum.

9. The booster circuit of claim 7 or 8 further comprising means for resetting said booster circuit when said flyback interval is shorter than said predetermined maximum interval.

* * * * *